United States Patent [19]

Boaz

[11] Patent Number: 4,770,685
[45] Date of Patent: Sep. 13, 1988

[54] METHOD OF MANUFACTURING A FORMED GLASS SHEET WITH PAINT THEREON

[75] Inventor: Premakaran T. Boaz, Livonia, Mich.

[73] Assignee: Ford Motor Company, Dearborn, Mich.

[21] Appl. No.: 72,937

[22] Filed: Jul. 13, 1987

[51] Int. Cl.[4] .......................................... C03B 23/023
[52] U.S. Cl. .......................................... 65/106; 65/24; 65/60.2; 65/60.51
[58] Field of Search .................... 65/24, 60.2, 60.51, 65/106

[56] References Cited

U.S. PATENT DOCUMENTS 3,455,722  7/1969  Kushihashi ..................... 65/60.2
4,596,590  6/1986  Boaz ............................... 65/60.51

Primary Examiner—Arthur Kellogg
Attorney, Agent, or Firm—William E. Johnson; Clifford L. Sadler

[57] ABSTRACT

A method of forming a glass sheet with ceramic paint thereon is disclosed. The method has the following general steps. A first ceramic paint (12) is applied to and dried on a glass sheet (10). The first ceramic paint includes a low temperature melting glass frit as a component thereof. A second ceramic paint (16) is applied over at least a portion of the dried first ceramic paint. The second ceramic paint includes as a component thereof a high temperature melting glass frit. The high temperature melting glass frit melts at a temperature higher than that temperature at which the low temperature melting glass frit melts at. The glass sheet is heated to a temperature which softens the glass sheet sufficiently so that the glass sheet can be formed. The heated glass sheet is engaged by a fiberglass covered forming die to form the glass sheet into a desired shape. The formed glass sheet is removed from the forming die, the second ceramic paint being effective to prevent sticking of any ceramic paint to the fiberglass covered forming die.

15 Claims, 1 Drawing Sheet

METHOD OF MANUFACTURING A FORMED GLASS SHEET WITH PAINT THEREON

TECHNICAL FIELD

This invention is directed to a method of manufacturing a formed glass sheet having a paint on a portion thereof. In part the invention relates to the composition of the paint that is applied to the glass sheet prior to the time it is formed, in a heated condition, by a forming die.

In the presently preferred embodiment, the painted portion on the glass sheet comprises two layers of ceramic paint. The ceramic paint compositions are designed so as to interact with one another in a manner that they do not stick to fiberglass covering a glass forming die at elevated temperatures when the fiberglass covered die is brought into contact therewith. The method of forming the glass sheet is one which allows a so-painted glass sheet to be contacted by the fiberglass covered die to form the glass sheet in a heated condition into a desired shape by applying large amounts of pressure on the glass sheet over small areas of the glass sheet. The forming operation may be carried out without any sticking of ceramic paint to the fiberglass covered forming die.

BACKGROUND ART AND PRIOR ART STATEMENT

It is common in certain applications to have curved or formed glass sheets with an opaque border portion. The border portion is commonly a paint that is applied to the glass sheet prior to the glass sheet being heated so that it can be formed by a forming die. A problem in the art has been the sticking of the painted surface to the forming die during the forming process.

Commonly the paints used are ceramic paint compositions generally well known to the skilled artisan. These ceramic paint compositions can be used, for example, to form borders around the edges of glass sheets which are used as windshields, sidelites and backlites in motor vehicles.

Such ceramic paints usually include a mixture of metal oxides which together act as a coloring agent for the ceramic paint. The metal oxides are nonreactive with one another and nonreactive with any elements or compounds they come in contact with while being heated to temperatures up to about 1300° F. The mixture of metal oxides can be controlled so as to get a selected color from the ceramic paint composition. Normally, in automotive applications, the selected color is black although shades of gray are now becoming popular.

Such ceramic paint compositions also include a glass frit which melts generally at a temperature well below 1350° F. The glass frit is the material which bonds the mixture of metal oxides to the glass sheet and ensures that the mixture of metal oxides remains after the glass sheet has been cooled back to room temperature.

A vehicle is normally mixed with the metal oxides and glass frit to allow the ceramic paint composition to be applied in a paint application process. For example, if the paint application process is a silk screen printing operation, the vehicle can be an oil-base or a UV-base organic medium for carrying the other materials during the silk screen printing operation.

In my U.S. Pat. No. 4,596,590, which issued on June 24, 1986, I disclosed a method of forming a glass sheet with a ceramic paint thereon. My patent contains a discussion of a problem encountered in the sticking of ceramic paint to a forming die covered by fiberglass when the forming die engages a heated glass sheet with ceramic paint thereon.

My patent discloses a method of forming a glass sheet with a ceramic paint thereon which has the following steps. A ceramic paint is applied to the glass sheet. The ceramic paint includes normal ceramic paint components along with, as a new component thereof, a metal oxide having at least a low valance oxidation stats and a high valance oxidation state. The metal oxide is in its low valance state when applied to the glass sheet as part of the ceramic paint. The glass sheet is heated to a temperature which softens the glass sheet sufficiently so that the glass sheet can be formed. The glass sheet and the ceramic paint thereon are engaged with a fiberglass covered forming die to form the heated glass sheet to a desired shape. The forming die is removed from engagement with the glass sheet. The metal oxide addition to the ceramic paint in its low valance state is credited with being effective to prevent sticking of any of the ceramic paint to the forming die. The glass sheet is cooled to obtain a formed glass sheet with a ceramic paint thereon.

In both U.S. patent application Ser. No. 936,575, filed Dec. 1, 1986, now U.S. Pat. No. 4,684,388, entitled "Method of Forming a Glass Sheet with a UV-Base Ceramic Paint Thereon, and U.S. application Ser. No. 936,576, filed Dec. 1, 1986, now U.S. Pat. No. 4,684,389, entitled "Method of Forming a Glass Sheet with an Oil-Base Ceramic Paint Thereon", I disclosed that the method proposed in my U.S. Pat. No. 4,916,590 when using stannous oxide as the metal oxide having at least a low valance oxidation state and a high valance oxidation state, did have some drawbacks. I found that in a UV-base system, when stannous oxide is present in the paint in an amount greater than 20% by weight or so, there is some tendency for the paint to stick to fiberglass when a relatively high pressure is applied to the painted glass sheet in a bending operation.

When working with an oil-base ceramic paint, I also found that the use of stannous oxide as the metal oxide having at least a low valance oxidation state and a high valance oxidation state also had some drawbacks. I found that stannous oxide did, in some cases, oxidize too rapidly when subjected to a heating operation. This rapid oxidation caused a fine, white dust to be generated. This dust has a tendency to move over the surface of the glass sheet during the bending operation. The loose dust, at an elevated temperature, can cause marking and/or indentation of the glass sheet, which results in a scrappage thereof.

In my application Ser. No. 936,575, now U.S. Pat. No. 4,684,388, I disclosed a method of forming a glass sheet with a UV-base ceramic paint thereon, the method having the following steps. A UV-base ceramic paint is applied to the glass sheet. The UV-base ceramic paint includes normal ceramic paint components along with, as a new component thereof, finely divided zinc metal powder. The glass sheet is subjected to UV radiation and then heated to a temperature which softens the glass sheet sufficiently so that the glass sheet can be formed. The glass sheet and the ceramic paint thereon are engaged with a fiberglass covered forming die to form the heated glass sheet to a desired shape. The forming die is removed from engagement with the glass sheet. The finely divided zinc metal powder addition to the ceramic paint is credited with being effective to prevent sticking of any of the ceramic paint to the forming die. The glass sheet is cooled to obtain a formed glass sheet with a ceramic paint thereon.

In my application Ser. No. 936,576, now U.S. Pat. No. 4,684,389, I disclosed a method of forming a glass sheet with an oil-base ceramic paint thereon, the method having the following steps. An oil-base ceramic paint is applied to the glass sheet. The oil-base ceramic paint includes normal ceramic paint components along with, as a new component thereof, finely divided zinc metal powder. The glass sheet is heated to a temperature which softens the glass sheet sufficiently so that the glass sheet can be formed. The glass sheet and the ceramic paint thereon are engaged with a fiberglass covered forming die to form the heated glass sheet to a desired shape. The forming die is removed from engagement with the glass sheet. The finely divided zince metal powder addition to the ceramic paint is credited with being effective to prevent sticking of any of the ceramic paint to the forming die. The glass sheet is cooled to obtain a formed glass sheet with a ceramic paint thereon.

Despite the methods that I have developed which have been described above, there are situations where paint sticking still occurs when high pressures are applied on a ceramic paint by a fiberglass covered die in which there is a high degree of bend over a relatively short distance. Under such conditions, I have found that even though zinc powder is added to the ceramic paint, a degree of sticking of the ceramic paint to the fiberglass cloth will take place in the areas of bending where high pressures over small areas are used between the fiberglass covered forming die and the painted glass sheet.

It is a principal object of the method of my invention to provide a method of forming a glass sheet with ceramic paint thereon which can be carried out at high contact pressures between a fiberglass covered forming die and ceramic paint without the sticking of ceramic paint to the fiberglass. The method which I disclose herein has been successfully developed for forming glass sheets with ceramic paint thereon under high pressure over small areas of such glass sheets without any sticking of ceramic paint to the fiberglass covered forming dies.

The most relevant prior art that I am aware of is the material discussed above. No search was conducted on the subject of this invention in the U.S. Patent and Trademark Office or in any other search facility.

BRIEF DESCRIPTION OF THE DISCLOSURE

This invention is directed to a method of forming a glass sheet with ceramic paint thereon and, more particularly, to a method of forming a glass sheet with ceramic paint thereon when the glass sheet is subjected to a high bending pressure over a small surface area by a fiberglass covered forming die during the forming of the glass sheet.

In accordance with the teachings of the method of my invention, a glass sheet is formed with ceramic paint thereon in the following manner. A first ceramic paint is applied to the glass sheet. The first ceramic paint includes a low temperature melting glass frit as a component thereof. The first ceramic paint is dried on the glass sheet.

A second ceramic paint is applied over at least a portion of the dried first ceramic paint. The second ceramic paint includes a high temperature melting glass frit as a component thereof. The high temperature melting glass frit melts at a temperature higher than that temperature at which the low temperature melting glass frit melts at.

The glass sheet is heated to a temperature which softens the glass sheet sufficiently so that the glass sheet can be formed. The glass sheet with the first and the second ceramic paints thereon is engaged with a fiberglass covered forming die to form the heated glass sheet to a desired shape. The forming die is removed from engagement with the glass sheet. The second ceramic paint is effective to prevent sticking of any of the ceramic paint to the forming die.

The second ceramic paint may include as a component thereof a material which reduces the sticking of that paint to fiberglass. Additionally, the first ceramic paint may include as a component thereof a material which reduces the sticking of that ceramic paint to fiberglass. It is preferred that both ceramic paints have a material which reduces the sticking of ceramic paints to fiberglass. It is also preferred that the second ceramic paint have a greater percent by weight of the fiberglass sticking reduction material therein than does the first ceramic paint.

A preferred method of forming a glass sheet with ceramic paint thereon in accordance with my invention has the following steps. A first ceramic paint is applied to the glass sheet. The first ceramic paint includes a low temperature melting glass frit, a fiberglass sticking reduction material, and an application vehicle as components thereof. The first ceramic paint is dried on the glass sheet.

A second ceramic paint is applied over at least a portion of the dried first ceramic paint. The second ceramic paint includes: a high temperature melting glass frit, a fiberglass sticking reduction material, and an application vehicle as components thereof. The high temperature melting glass frit melts at a temperature higher than the temperature at which the low temperature melting glass frit melts.

The glass sheet is heated to a temperature which softens the glass sheet sufficiently so that the glass sheet can be formed. The glass sheet with the first and the second ceramic paints thereon is engaged with a fiberglass covered forming die to form the heated glass sheet to a desired shape. The forming die is removed from engagement with the glass sheet. The second ceramic paint and the fiberglass sticking reduction material contained in both ceramic paints being effective to prevent sticking of any of the ceramic paint to the forming die. The glass sheet is then cooled to obtain a formed glass sheet with ceramic paint thereon. If the glass sheet is cooled rapidly, the final glass sheet is tempered by the rapid cooling process.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings wherein like reference characters indicate like parts throughout the several figures, and in which:

BEST MODE AND INDUSTRIAL APPLICABILITY

Figure 1:
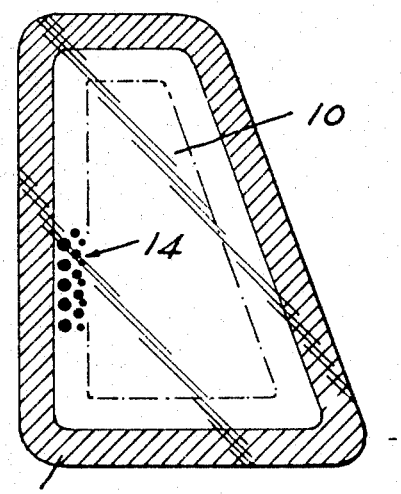
FIG. 1 is a front elevation view of a glass sheet having ceramic paint thereon formed in accordance with the method of my invention.

The following description is what I consider to be a preferred embodiment of the method of my invention of forming a glass sheet with ceramic paint thereon. The following description also sets forth what I now contemplate to be the best mode of carrying out my inventive method. The description is not intended to be a limitation upon the broader principles of this method, and while preferred materials are used in teaching the method of my invention in accordance with the requirements of the laws, it does not mean that other materials cannot be used in my method.

In the drawings there is shown a glass sheet 10 formed of soda/lime silica glass. Such a glass sheet may be cut from a glass sheet manufactured by a float glass process. In this particular case, the glass sheet is one which is installed in a motor vehicle between the backlite and the last glass window associated with a vehicle door. This glass sheet is generally called a quarter lite.

The glass sheet 10, as viewed in FIG. 1, has an opaque ceramic band 12 therearound as well as a plurality of opaque ceramic dots therearound of varying sizes, generally identified by the numeral 14. As seen in FIG. 1, this is the surface of the glass sheet which would be viewed by someone standing on the outside of a vehicle when the glass sheet is installed in that vehicle. The ceramic band and ceramic dots are used to form an aesthetically pleasing way of camouflaging the back of retaining clips and other upholstering items which otherwise could be viewed therethrough. Such camouflaging on automotive glass is in wide use today.

The ceramic band 12 and ceramic dots 14 are applied by applying a first ceramic paint to what is to be the inside surface of the glass sheet 10. The first ceramic paint includes a low melting glass frit as a component thereof. In accordance with the preferred embodiment of the method of my invention, the low melting glass frit melts at a temperature in a range of 1100°–1225° F.

As is disclosed in my aforementioned U.S. Pat. No. 4,596,590 and is known to the art, the ceramic paint is made up of several other ingredients besides the glass frit. The ceramic paint composition also includes as an element thereof a mixture of metal oxides which together act as a coloring agent for the ceramic paint. The mixture of metal oxides are nonreactive with one another and nonreactive with any elements or compounds they come in contact with while being heated to a temperature in a range up to 1300° F. A vehicle is also mixed with the metal oxides and the low melting point glass frit to form all of the mentioned materials into a ceramic paint which can be applied to the glass surface in a process such as a silk screen printing operation.

In accordance with the teachings of the method of my invention, the first ceramic paint applied to the glass sheet 10 can form both the ceramic band 12 and the ceramic dots 14. In my preferred embodiment, I use Drakenfeld paint composition 24–2247 in a 1718 UV curable medium. In the preferred embodiment, the first ceramic paint contains, on a weight percent basis: 32% metal oxide mixture of iron, manganese, chrome and nickel; 43% of glass frit which melts at a temperature in a range from 1150° to 1200° F.; and 25% of the 1718 organic vehicle. As will be described below, one can also add a material to the ceramic paint composition which reduces the sticking of ceramic paint to fiberglass. The first ceramic paint may be applied to the glass sheet through a 255 mesh screen.

The first ceramic paint is dried on the glass sheet 10. If the vehicle used to make the ceramic paint is an oil-base vehicle, then the first ceramic paint is dried by heating the glass sheet to a temperature sufficient to volatilize the oil-base vehicle, leaving behind the other materials of the paint which are not volatile. If the vehicle of the ceramic paint is a UV cross-linkable material, as it is in the preferred embodiment, the first ceramic paint is dried by UV curing the vehicle by the application of UV energy as is well known in the art.

Figure 2:
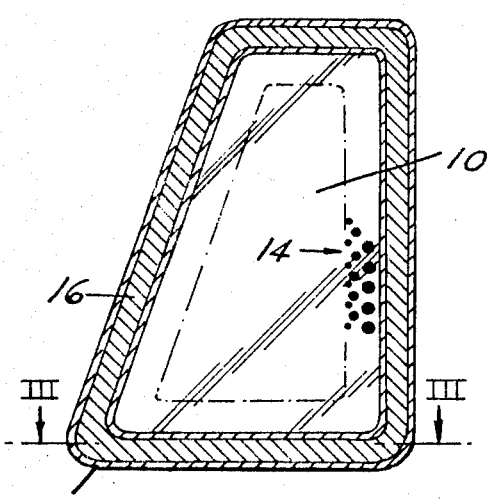
FIG. 2 is a rear elevation view of the glass sheet of FIG. 1.
Figure 3:
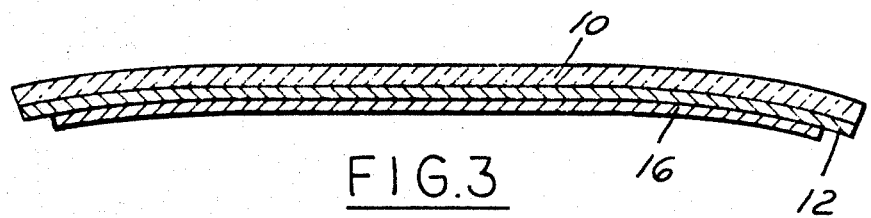
FIG. 3 is a cross-sectional view taken along line III—III of FIG. 2 showing the glass sheet in a formed condition with ceramic paint thereon being shown in an exaggerated condition.

As seen in FIG. 2, which depicts the reverse side of the glass sheet 10 of FIG. 1, there is shown a second ceramic band 16. In the preferred embodiment, the second ceramic band 16 is shown formed over the first ceramic band 12, basically being positioned about a ¼ inch inside the outboard edges of the first ceramic band.

This second ceramic band 16 is developed by applying a second ceramic paint over at least a portion of the dried first ceramic paint. The second ceramic paint includes a high temperature melting glass frit as a component thereof. The high temperature melting glass frit melts at a temperature higher than the temperature at which the low temperature melting glass frit melts at. In the preferred embodiment disclosed herein, the high temperature melting glass frit melts at a temperature in a range of 1275°–1350° F.

For the second ceramic paint, I used Drakenfeld paint composition 24–2276 in a 900 oil base vehicle. In this preferred embodiment, the second ceramic paint contains, on a weight percent basis: 35% metal oxide mixture of iron, manganese, chrome, nickel and cobalt; 40% of glass frit which melts at a temperature in a range from 1275° to 1325° F.; and 25% of the 900 organic vehicle. A material which reduces ceramic paint sticking to fiberglass may also be included in the second ceramic paint composition as will be set forth below. The second ceramic paint composition may be printed through a 305 mesh screen.

The next step in my method is that of heating the glass sheet 10 to a temperature which softens the heated glass sheet sufficiently so that the glass sheet can be formed. Normally this softening temperature of the glass sheet is a temperature in a range of 1000°–1200° F., preferably 1100° F.

The heated glass sheet 10, with the first and the second ceramic paints thereon, is engaged with a fiberglass covered forming die to form the heated glass sheet to a desired shape. Thereafter, the forming die is removed from engagement with the glass sheet. The second ceramic paint, which is fused to the glass sheet by the low melting glass frit of the first ceramic paint, is effective to prevent the sticking of the ceramic paint to the forming die. I believe this occurs because the higher melting point glass frit of the second ceramic paint does not soften sufficiently to stick to the fiberglass covered forming die and therefore acts as a protective barrier.

In accordance with more detailed teachings of the method of my invention, the second ceramic paint includes as a component thereof a material which reduces the sticking of ceramic paint to fiberglass. As mentioned previously, prior patent applications of mine have disclosed that finely divided zinc metal powder and finely divided stannous oxide powder are suitable nonstick materials. The material which reduces the sticking of ceramic paint to fiberglass may also be included in the first ceramic paint.

In accordance with still further preferred teachings of the method of my invention, the first ceramic paint includes 10-30% by weight of the finely divided nonstick material and the second ceramic paint includes 30-60% by weight of the finely divided fiberglass sticking reduction material.

In accordance with the teachings of a preferred embodiment of the method of my invention, the first 12 and second 16 ceramic bands have a thickness in a range of about 0.0008-0.0012 inch.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

I claim:

1. A method of manufacturing a formed glass sheet with ceramic paint thereon, which method comprises the steps of:
    applying a first ceramic paint to said glass sheet, said first ceramic paint including a low temperature melting glass frit as a component thereof;
    drying said first ceramic paint on said glass sheet;
    applying a second ceramic paint over at least a portion of said dried first ceramic paint, said second ceramic paint including a high temperature melting glass frit as a component thereof, said high temperature melting glass frit melting at a temperature higher than that temperature at which said low temperature melting glass frit melts at;
    heating said glass sheet to a temperature which softens said glass sheet sufficiently so that said glass sheet can be formed;
    engaging said glass sheet with said first and said second ceramic paints thereon with a fiberglass covered forming die to form said heated glass sheet to a desired shape; and
    removing said forming die from engagement with said glass sheet, said second ceramic paint being effective to prevent sticking of any ceramic paint to said forming die.

2. The method of claim 1 wherein: said second ceramic paint includes as a component thereof a material which reduces the sticking of ceramic paint to fiberglass.

3. The method of claim 1 wherein: both said first and said second ceramic paints include as a component thereof a material which reduces the sticking of ceramic paint to fiberglass.

4. The method of claim 3 wherein: said second ceramic paint has a greater percent by weight of said fiberglass sticking reduction material therein than does said first ceramic paint.

5. A method of manufacturing a formed glass sheet with ceramic paint thereon, which method comprises the steps of:
    applying a first ceramic paint to said glass sheet, said first ceramic paint including: a low temperature melting glass frit, a fiberglass sticking reduction material, and an application vehicle as components thereof;
    drying said first ceramic paint on said glass sheet;
    applying a second ceramic paint over at least a portion of said dried first ceramic paint, said second ceramic paint including: a high temperature melting glass frit, a fiberglass sticking reduction material, and an application vehicle as components thereof, said high temperature melting glass frit melting at a temperature higher than that temperature at which said low temperature melting glass frit melts at;
    heating said glass sheet to a temperature which softens said glass sheet sufficiently so that said glass sheet can be formed;
    engaging said glass sheet with said first and said second ceramic paints thereon with a fiberglass covered forming die to form said heated glass sheet to a desired shape;
    removing said forming die from engagement with said glass sheet, said second ceramic paint and said fiberglass sticking reduction material being effective to prevent sticking of any ceramic paint to said forming die; and
    cooling said glass sheet to obtain a formed glass sheet with ceramic paint thereon.

6. The method of claim 5 wherein: said application vehicle of said first ceramic paint is a UV curable material, and wherein said first ceramic paint is dried by the application of UV energy thereto.

7. The method of claim 5 wherein: said application vehicle of said first ceramic paint is an oil based material, and wherein said first ceramic paint is dried by the application of heat.

8. The method of claim 5 wherein: said fiberglass sticking reduction material is finely divided zinc metal.

9. The method of claim 8 wherein: said first ceramic paint is 10 to 30% by weight of said finely divided zinc metal and said second ceramic paint is 30 to 60% by weight of said finely divided zinc metal.

10. The method of claim 5 wherein: said first and said second ceramic paints each have a thickness in a range from 0.0008 inches to 0.0012 inches.

11. The method of claim 5 wherein: said low temperature melting glass frit melts at a temperature in a range from 1100° F. to 1225° F., and said high temperature melting glass frit melts at a temperature in a range from 1275° F. to 1350° F.

12. A method of manufacturing a formed glass sheet with a painted surface thereon, which method comprises the step of:
    applying a paint to said glass sheet, said paint including a first glass frit and a second glass frit, said first glass frit having a lower melting point than said second glass frit, whereby said first glass frit functions to assist the adherence of said paint to said glass and said second glass frit functions to assist the parting of said die from said painted surface without said paint sticking to said die;
    heating said glass sheet to a temperature which softens said glass sheet sufficiently so that said glass sheet can be formed but not sufficiently high enough temperature to completely soften said glass frit in said paint;
    engaging said glass sheet with said paint thereon with a forming die to form said heated glass sheet to a desired shape;

said glass frit in said paint being effective to resist sticking of said paint to said forming die.

13. The method of claim 12 wherein:
said first glass frit melts at a temperature in a range from 1100° F. to 1225° F. and said second glass frit melts at a temperature in a range from 1275° F. to 1350° F.;
said glass sheet being formed be said die when said glass sheet is heated to a temperature in the range of 1000° F. to 1200° F.

14. The method of claim 12 wherein:
said paint includes a first layer that contains a first glass frit that melts at a temperature in a range from 1100° F. to 1225° F.;
said paint also including a second layer that contains a second glass frit that melts at a temperature in a range from 1275° F. to 1350° F.;
said glass sheet being formed by said die when said glass sheet is heated to a temperature in the range of 1000° F. to 1200° F.;
whereby said first layer functions to assist the adherence of said paint to said glass and said second frit functions to assist the parting of said die from said painted surface without said paint sticking to said die.

15. A method of manufacturing a formed glass sheet with ceramic paint thereon, which method comprises the steps of:
applying a first ceramic paint to said glass sheet to a thickness in a range from 0.0008 inches to 0.0012 inches, said first ceramic paint including a low temperature melting glass frit which melts at a temperature in a range from 1100° F. to 1225° F., a finely divided zinc metal forming 10% to 30% by weight of said first ceramic paint, and an application vehicle as components thereof;
drying said first ceramic paint on said glass sheet;
applying a second ceramic paint over at least a portion of said dried first ceramic paint to a thickness in a range from 0.0008 inches to 0.0012 inches, said second ceramic paint including: a high temperature melting glass frit which melts at a temperature in a range from 1275° F. to 1350° F., a finely divided zinc metal forming 30% to 60% by weight of said second ceramic paint, and an application vehicle as components thereof;
heating said glass sheet to a temperature in a range from 1000° F. to 1200° so that said glass sheet can be formed;
engaging said glass sheet with said first and said second ceramic paints thereon with a fiberglass covered forming die to form said heated glass sheet to a desired shape;
removing said forming die from engagement with said glass sheet, said second ceramic paint and said fiberglass sticking reduction material being effective to prevent sticking of any ceramic paint to said forming die; and
cooling said glass sheet to obtain a formed glass sheet with ceramic paint thereon.

* * * * *